United States Patent [19]

Leverton

[11] 4,015,455
[45] Apr. 5, 1977

[54] LOCKING UNIT FOR IMMOBILIZING VEHICLES
[75] Inventor: Peter Leverton, South Kirkby, near Pontefract, England
[73] Assignee: Nu-Line Products (Engineering) Limited, United Kingdom
[22] Filed: Aug. 27, 1975
[21] Appl. No.: 608,025
[52] U.S. Cl. .................................. 70/19; 70/202; 70/210; 70/231; 70/237
[51] Int. Cl.² ........................................ E05B 17/00
[58] Field of Search ................. 70/14, 19, 57, 174, 70/176, 177, 192, 199, 201, 202, 204, 206, 209, 237, 245, 247, 238, 182, 183, 232, 210, 231

[56] References Cited
UNITED STATES PATENTS

| 1,281,705 | 10/1918 | Taylor | 70/245 |
| 1,387,156 | 8/1921 | Igo et al. | 70/182 |
| 1,447,374 | 3/1923 | Bowzer | 70/19 |
| 1,717,602 | 6/1929 | Goodspeed | 70/202 X |
| 1,764,383 | 6/1930 | Bezek | 70/202 |
| 3,269,159 | 8/1966 | Young | 70/232 |

FOREIGN PATENTS OR APPLICATIONS

| 652,145 | 3/1929 | France | 70/202 |
| 56,545 | 9/1952 | France | 70/202 |

Primary Examiner—Ramon S. Britts
Assistant Examiner—William E. Lyddane
Attorney, Agent, or Firm—Wolf, Greenfield & Sacks

[57] ABSTRACT

A locking unit for immobilizing road vehicles to prevent their unauthorized removal comprises a sealed body which houses a movable locking member projecting from the housing and adapted for connection with a brake or clutch operating foot pedal or hand lever or with the control valve of an air-powered parking brake system. The sealed body also houses a key-released lock of the rotary barrel type having its plunger movable into locking engagement with the locking member manually without use of the key. The locking member may be a ratchet wheel engageable by a pawl which is pushed into engagement by the lock plunger acting on a spring. Further springs ensure the pawl being held clear of the wheel when the lock plunger is withdrawn. A modified form of the unit has a fixed jaw and a movable jaw by which the unit can be clamped around the stem of the draw-pin of a trailer vehicle and locked without using the key, thereby to prevent the hitch of a tractor from being coupled thereto.

3 Claims, 11 Drawing Figures

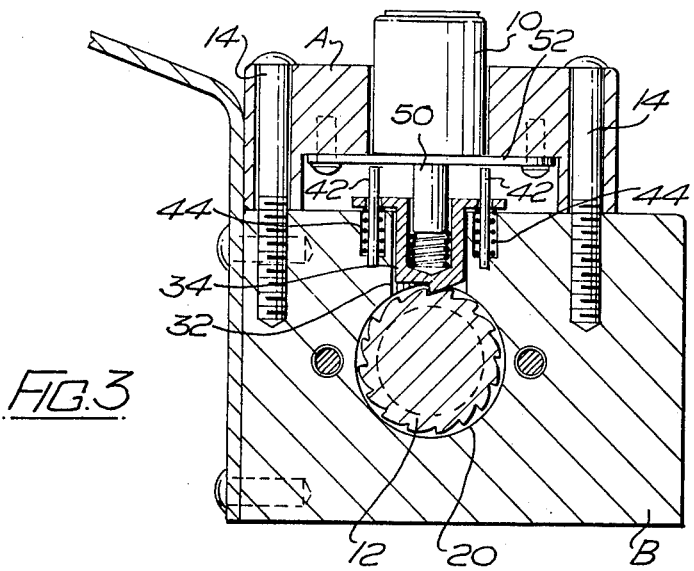
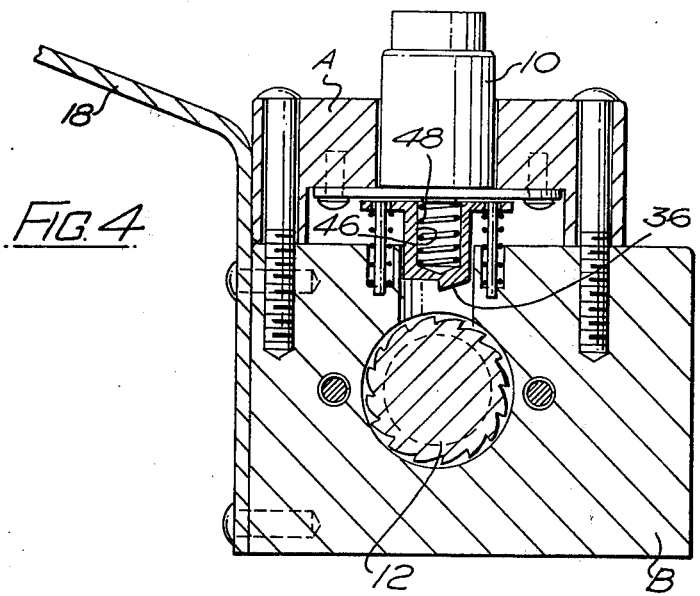
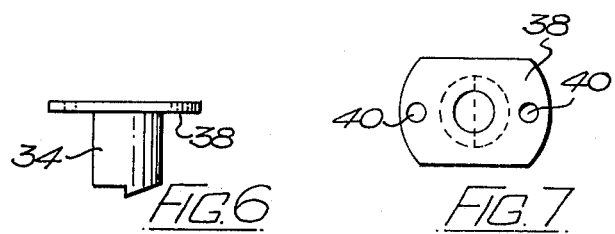

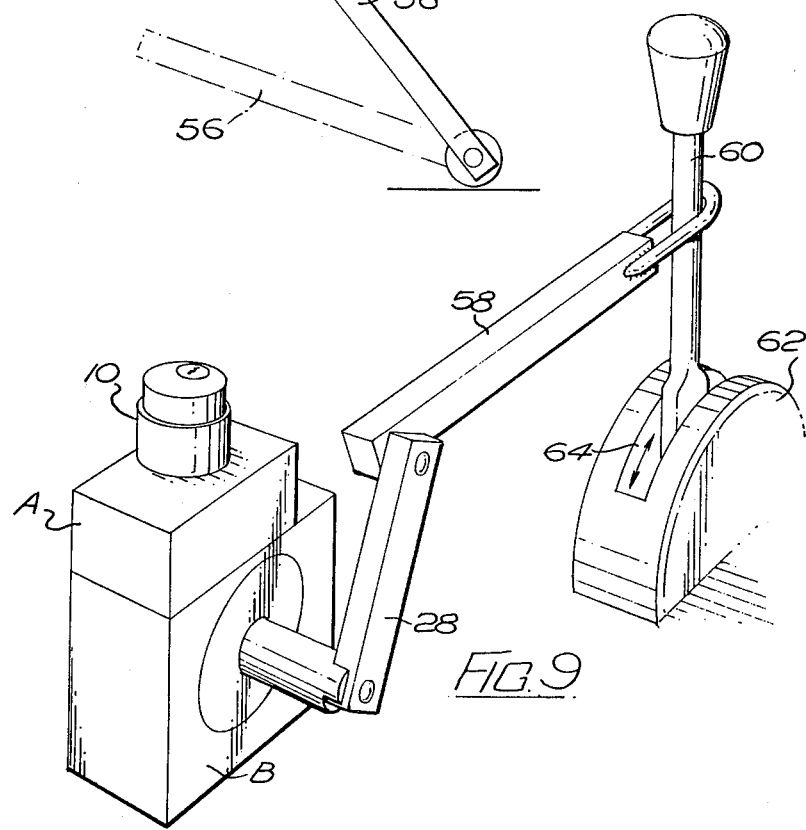

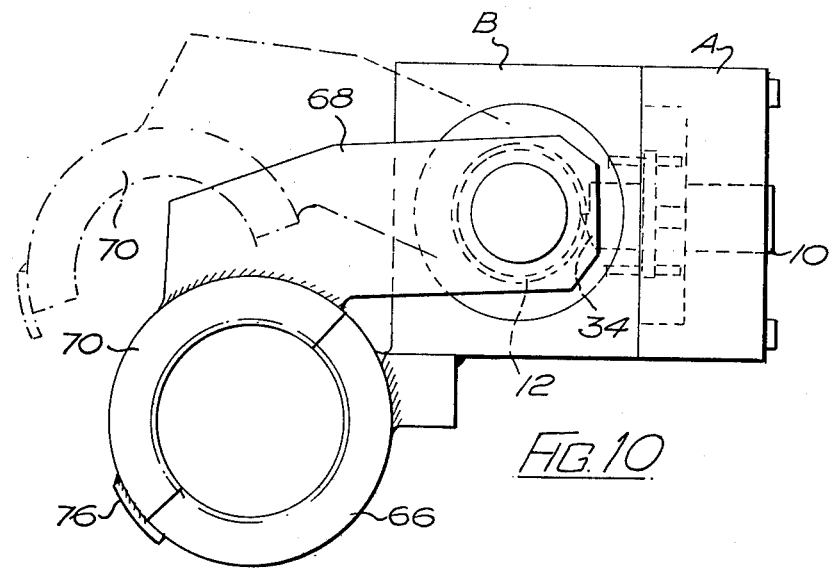
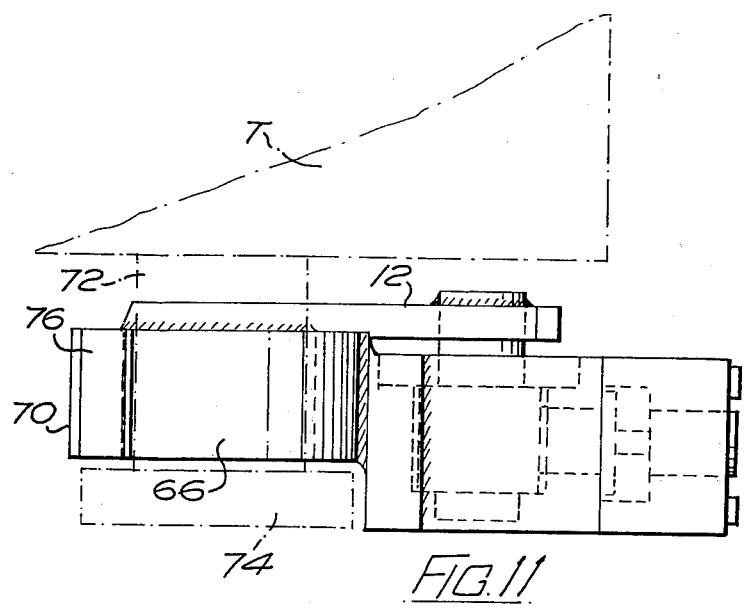

LOCKING UNIT FOR IMMOBILIZING VEHICLES

This invention relates to a locking unit intended primarily for immobilising road vehicles, whether of passenger or goods type, to prevent their unauthorised removal.

Various forms of devices or appliances have been proposed for the above purpose, these being generally adapted for locating between the clutch pedal or lever and a fixed part of the vehicle near the driver's seat and arranged to be locked and unlocked by the key of a lock to hold the clutch out of operation or to free it for operation. This prevents the vehicle from being driven away by an unauthorised person.

However, such prior proposed devices or appliances have some disadvantages. Generally, the lock or part thereof has to be applied and removed and parts may be mislaid or lost. In some cases the appliance has to be applied by the user who may be inexperienced and for this or other reasons may apply it wrongly. Also, if the appliance, or some part thereof, is left in position but unlocked, there may be a risk of interference thereby with the proper or safe use of the pedal or lever to which the appliance is applied.

The chief object of the invention is to provide a multi-purpose basic locking unit which is capable of being used with or without auxiliary attachments in a large variety of ways and on a large range of vehicles.

A basic locking unit according to the invention comprises a sealed body which houses a rotary locking member having a rotary shaft or other rotary actuating member projecting from the housing and adapted for operative connection with an appropriate part of the vehicle, which also houses a key-released lock of the rotary barrel type having a hasp, plunger or like member movable into locking engagement with said locking member manually without use of the key. The construction of this unit is such that the shaft or other rotary actuating member can be formed in one with, or secured to, any suitable link, lever, clamp or other obstructing member which forms part of the vehicle or which can be attached or applied thereto in such a way as to prevent or at least render difficult unauthorised driving or moving of the vehicle.

For example, the locking unit may be adapted to have its shaft or other rotary actuating member connected with a foot pedal or hand lever which normally is used to operate a brake or brakes or a clutch whereby the unit when locked holds the brake or brakes in the "on" position or holds the clutch in one of its extreme positions.

Another application of the locking unit may be to heavy goods vehicles, commercial vehicles and the like equipped with air brakes and incorporating an air-powered parking brake system. This parking brake system is usually operated by a manual control lever which actuates a distributing valve controlling the flow of compressed air to the parking brakes, which may act on all the road wheels or on some only.

For example, the actuating member of the unit may be adapted to be linked to an operating part of the parking brake system, preferably to the said valve control lever thereof so that when the control valve is operated to apply the brakes, the actuating member can be locked to the body of the unit without use of the key to maintain this brake condition, the use of the key being essential, however, to free the actuating member.

Alternatively, the locking unit may be supported directly on or in close association with the control valve so that the plunger or like member of the lock can be moved into locking engagement with the control lever or with the movable valve member itself. In these two applications of the invention as will readily be appreciated, the actuating member need not embody any linkage as such, since the locking unit may be mounted on or close to the valve; for example, the lock plunger may engage a ratchet tooth or recess (or one of a series thereof) on the movable valve member.

In some forms of the invention, the lock plunger may be movable in a direction parallel to the axis of rotation of a recessed or toothed quadrant or wheel forming the actuating member or part thereof. As an alternative, however, the lock plunger may be arranged to operate in a direction at right angles to the axis of rotation of the said quadrant or of a ratchet toothed member or to the axis of rotation of the valve member. In the latter case, in order to enable a standard lock to be used the plunger may be arranged to actuate a pawl or other intermediate engagement member which actually engages the recess or tooth to achieve the locking action.

The lock itself is of the rotary barrel type having a spring-retracted plunger operated by finger pressure on a finger button end and held by a catch associated with the barrel tumblers, such button end being all that appears of the lock on the outer face of the unit body. The nose of the plunger or a pawl or catch member operated thereby can engage recesses, teeth or other locking surfaces provided in or on a quadrant, disc or wheel which is secured on the rotary shaft or other member of the unit. Preferably the lock plunger engages ratchet teeth so that movement of the locking parts to their locked positions can be done quickly and easily.

One construction of locking unit according to the invention and several arrangements for applying the same to a vehicle, are illustrated by way of example in the accompanying drawings, wherein:

FIGS. 3 and 4 are both sectional views taken on the line X — X in FIG. 2, FIG. 3 showing the parts in their locked positions and FIG. 4 showing them in their unlocked positions;

FIGS. 6 and 7 are respectively an elevation and a plan of a pawl device;

FIG. 8 illustrates the application of the locking unit to a foot pedal of a vehicle;

FIG. 9 illustrates the application of the locking unit to the manual control lever of an air-powered parking brake system of a vehicle; and FIGS. 10 and 11 are respectively a plan and elevation of a modified form of the locking unit arranged for application to the draw pin of a trailer vehicle to prevent the hitching thereto of a tractor vehicle.

Figure 1:
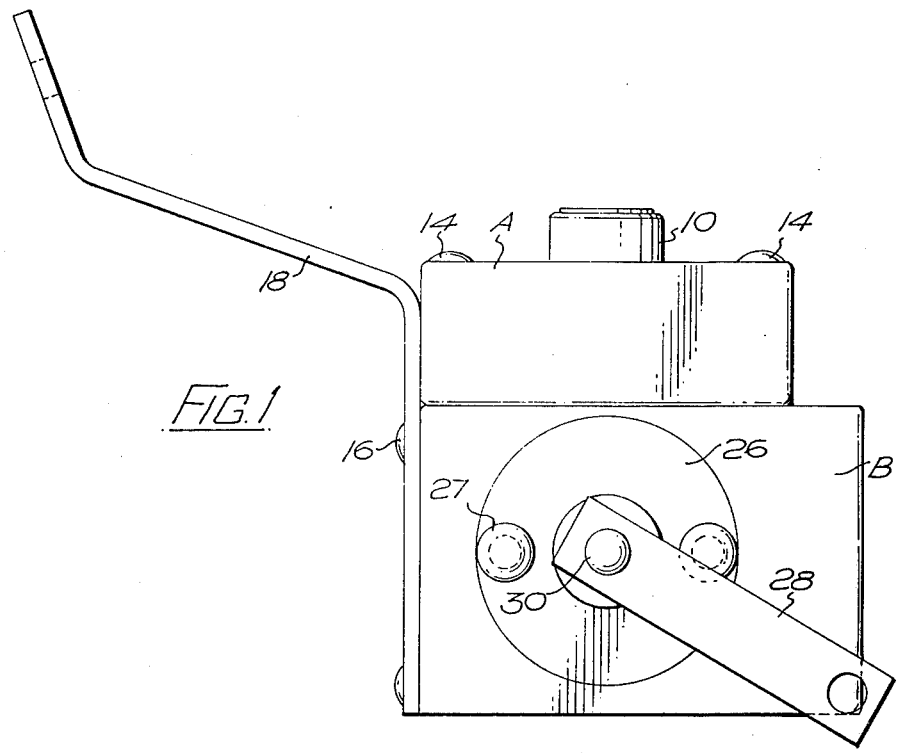
FIGS. 1 and 2 are respectively an elevation and a plan of the locking unit.
Figure 2:
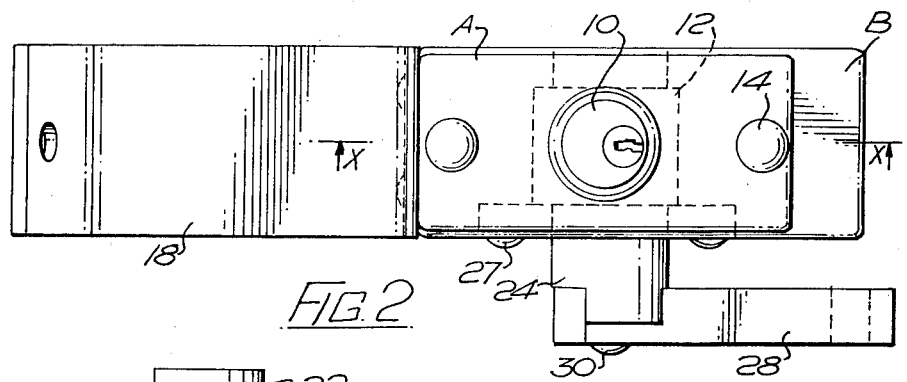
Figure 5:
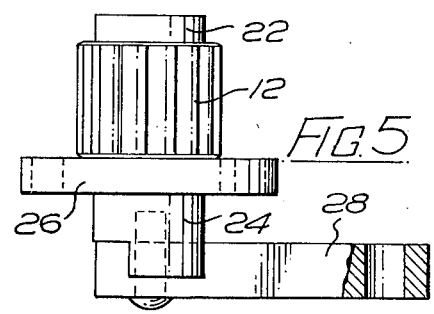
FIG. 5 is a plan view of the rotary locking and actuating member shown and indicated in FIG. 2.

Referring first to FIGS. 1 to 7 of the drawings. the locking unit comprises a sealed body having two body portions A and B housing respectively a rotary barrel lock 10 and a rotary locking member 12. These two portions are shown as being secured together by screw-threaded studs 14 whose heads, after final assembly of the unit, are sheared off or ground off or drilled away to render it difficult for an unauthorised person to gain access to the interior of the unit which is thus effectively sealed. The portion B has secured to it in a similar manner by studs 16 a supporting bracket 18 which may be of any suitable shape for mounting upon a convenient part of the vehicle by means of studs, bolts or fastenings which again would be rendered difficult to remove or release.

The two portions could alternatively be secured together by welding to produce a sealed unit.

The portion B has an annular chamber 20 housing the rotary locking member 12 which is in the form of a ratchet wheel having a reduced end boss 22 which finds a bearing in a recess of the housing. The ratchet wheel has a shaft portion 24 which finds a bearing in a bearing plate 26 secured to the portion B by studs 27 whose heads are then treated in the same manner as those of the studs 14 and 16. This shaft constitutes the rotary actuating member of the unit and has fixed upon it outside the portion B by a stud 30 a coupling arm 28 for coupling to the movable feature of the vehicle which is to be locked. This stud again has its head treated to render removal of the stud or the arm difficult.

The portion B has a cylindrical chamber 32 with its axis at right angles to that of the chamber 20 and communicating with that chamber. A pawl 32 is slidable in chamber 32 so that its nose 36 can engage one of the teeth of the ratchet wheel 12 to prevent rotation thereof in a clockwise direction as seen in FIGS. 3 and 4. The pawl 34 has a flange 38 with holes 40,40 by which it engages over guide pins 42,42. These pins are let into portion B and surrounded by return compression coil springs 44,44 which urge the pawl out of engagement with the ratchet wheel. The pawl has a central socket 46 containing a compression coil spring 48 against which acts the axially movable plunger 50 of the lock 10, the lock being secured by its backplate 52 in a recess of the portion A with only the key end of the lock accessible from outside the sealed body.

The operation of these parts is as follows. In the unlocked position shown in FIG. 4, the plunger 50 being held withdrawn by the usual lock return spring (not shown), the springs 44,44 hold the pawl 34 clear of the ratchet 12 so that arm 28 is free to move with (for example) a brake pedal to which it is connected. If, with the brake pedal in its fully applied position, the lock barrel is pushed in as in FIG. 3, its plunger 50 acts on spring 48 to press the pawl 34 into engagement with the ratchet 12 and so lock the brakes on. The spring 48 is stronger than the sum of springs 44,44 but is not fully compressed in the locked position so that the pawl is allowed to yield enough to enable the ratchet to be rotated in the anti-clockwise direction as seen in FIGS. 3 and 4, thereby enabling arm 28 to be moved into its desired locking position quickly by a ratcheting action even after the lock 10 has been applied.

When the lock is freed by inserting and turning the key, the plunger 50 is automatically withdrawn and the springs 44,44 move the pawl clear of the ratchet to allow arm 28 free movement. The springs 44,44 are jointly stronger than the return spring in the lock 10 to guard against accidental engagement of the pawl and ratchet which would interfere with normal operation of the brake pedal or other vehicle part connected to arm 28.

FIG. 8 illustrates the locking unit with arm 28 pivotally connected by a link 54 to a brake pedal 56 of a vehicle, but with this linkage as illustrated, the ratchet 12 would be arranged to operate in the reverse direction to that illustrated in FIGS. 3 and 4.

In FIG. 9 the same locking unit as above described has its arm 28 pivotally connected by a link 58 to the control lever 60 of the parking brake valve whose body is indicated at 62 with its guide slot 64 in which the lever is moved. When the lever 60 is moved to the brakes on position and the lock barrel pressed into its locked position, the lever is immobilised and can only be released by use of the lock key.

In FIGS. 10 and 11 there is shown a sealed locking unit as already described above but having welded thereto a fixed jaw 66 of semicircular form. Instead of the coupling arm 28 of the previously described constructions there is welded to the actuating shaft 24 one end of an arm 68 to the other end of which is welded a movable semicircular jaw 70. These jaws co-operate to form a clamp when brought together to form a ring and by pressing in the lock barrel to engage the pawl and ratchet, the jaws are locked in their closed position. With the jaws open the lock unit can be applied around the stem 72 of the draw pin 74 on a trailer vehicle (particularly an articulated trailer) by which a tractor vehicle is usually coupled to a trailer. In the case of heavy trailer vehicles this effectively immobilises the trailer by obstructing the coupling to the draw pin of the usual tractor hitch. A lip 76 welded on the jaw 70 serves as a guard to mask the meeting line of the jaws and render it difficult for an unauthorised person to force the clamp open.

In this form of the locking unit the whole unit would be removed completely from the trailer vehicle when not locked upon the draw pin, but in suitable cases it might be secured on the vehicle by means rendering it difficult to remove but still capable of being swung or otherwise moved into its locking position.

In any suitable form of the sealed locking unit of this invention, the said locking member and/or the said actuating member, instead of having rotary motion, may have a linear or other motion provided it or they can be linked with the said appropriate part of the vehicle to achieve the immobilising result hereinbefore described.

I claim:
1. A locking unit for immobilizing a road vehicle, comprising
   1. a sealed housing adapted to be affixed to the vehicle,
   2. a locking member operatively connected to the sealed housing by a shaft arranged to rotate in the housing, the shaft carrying ratchet teeth within the housing, at least one end of the shaft being accessible from outside the housing and having a coupling arm attached thereto whereby the coupling arm can be connected to an appropriate part of the vehicle,
   3. a pawl mounted in the housing for engagement with the ratchet teeth on the locking member,
   4. guide means in the housing for guiding the pawl into engagement with the ratchet teeth,
   5. first resilient means in the housing urging the pawl out of engagement with the locking member,
   6. a lock affixed to the housing, the lock having a barrel arranged to move in and out relative to the ratchet teeth of the locking member, one end of the barrel being adapted to actuate the pawl, the lock being released by a key to permit movement of the barrel, and
   7. second resilient means disposed between the pawl and said one end of the barrel whereby inward movement of the barrel causes the pawl to engage the ratchet teeth and prevent rotation of the locking member in one direction while permitting rotation in the opposite direction.

2. A locking unit according to claim 1, wherein the guide means include means for confining movement of the pawl to a substantially linear path between the lock and the ratchet teeth on the shaft of the locking member.

3. A locking unit according to claim 1, wherein the coupling arm provides a jaw outside the housing and wherein the locking unit further includes
an external jaw affixed to and extending from the sealed housing, and the two jaws being arranged to cooperate to form a clamp adapted to lock around the stem of a draw pin of a trailer.

* * * * *